United States Patent
Gupta et al.

(10) Patent No.: US 9,967,727 B2
(45) Date of Patent: May 8, 2018

(54) SYSTEMS AND METHODS FOR ACCESS NETWORK SELECTION AND TRAFFIC ROUTING

(71) Applicants: Vivek Gupta, Milpitas, CA (US); Puneet K. Jain, Hillsboro, OR (US)

(72) Inventors: Vivek Gupta, Milpitas, CA (US); Puneet K. Jain, Hillsboro, OR (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days. days.

(21) Appl. No.: 14/128,184

(22) PCT Filed: Sep. 26, 2013

(86) PCT No.: PCT/US2013/061897
§ 371 (c)(1),
(2) Date: Dec. 20, 2013

(87) PCT Pub. No.: WO2014/130091
PCT Pub. Date: Aug. 28, 2014

(65) Prior Publication Data
US 2015/0105076 A1 Apr. 16, 2015

Related U.S. Application Data

(60) Provisional application No. 61/768,330, filed on Feb. 22, 2013.

(51) Int. Cl.
*H04W 4/00* (2018.01)
*H04W 8/00* (2009.01)
(Continued)

(52) U.S. Cl.
CPC ......... *H04W 8/005* (2013.01); *H04L 12/4633* (2013.01); *H04L 27/2614* (2013.01);
(Continued)

(58) Field of Classification Search
CPC . H04W 36/0083; H04W 48/18; H04W 36/16; H04W 36/24; H04W 24/02;
(Continued)

(56) References Cited

U.S. PATENT DOCUMENTS

2009/0042601 A1* 2/2009 Wang et al. ............... 455/553.1
2010/0190500 A1* 7/2010 Choi et al. .................... 455/436
(Continued)

FOREIGN PATENT DOCUMENTS

CN 102007800 A 4/2011
WO 2009127238 A1 10/2009
(Continued)

OTHER PUBLICATIONS

International Search Report and Written Opinion received for PCT Patent Application No. PCT/US2013/061897, dated Jan. 2, 2014, 10 pages.

*Primary Examiner* — Kwasi Karikari
(74) *Attorney, Agent, or Firm* — Stoel Rives LLP

(57) ABSTRACT

Methods, systems, and devices for network selection and traffic routing are disclosed herein. User equipment (UE) is configured to store an access network selection and detection function (ANDSF) management object (MO). The ANDSF MO may include network selection rules indicating relative priority based on a specific radio access technology (RAT) types of different access networks. The UE is configured to identify one or more available access networks. The UE is configured to establish a connection with an access network of the one or more available access networks. The UE establishes the connection with an access network having a RAT with a highest relative priority of the one or more available access networks based on the network selection rules.

23 Claims, 8 Drawing Sheets

(51) Int. Cl.
| | |
|---|---|
| H04W 72/04 | (2009.01) |
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 48/14 | (2009.01) |
| H04W 52/02 | (2009.01) |
| H04W 28/12 | (2009.01) |
| H04L 12/801 | (2013.01) |
| H04W 48/08 | (2009.01) |
| H04W 48/16 | (2009.01) |
| H04W 72/02 | (2009.01) |
| H04W 88/06 | (2009.01) |
| H04L 12/725 | (2013.01) |
| H04W 28/08 | (2009.01) |
| H04W 84/12 | (2009.01) |

(52) U.S. Cl.
CPC .............. *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/02* (2013.01); *H04W 72/042* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 84/12* (2013.01); *H04W 88/06* (2013.01); *Y02B 60/50* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/22* (2018.01); *Y02D 70/23* (2018.01)

(58) Field of Classification Search
CPC .............. H04W 28/0226; H04W 36/00; H04W 36/0022; H04W 36/0088; H04W 36/36; H04W 72/10; H04W 76/028; H04W 28/08; H04W 36/0016
USPC .......................................... 455/436, 524, 418
See application file for complete search history.

(56) References Cited

U.S. PATENT DOCUMENTS

| | | | |
|---|---|---|---|
| 2010/0216469 A1* | 8/2010 | Yi et al. | 455/435.3 |
| 2010/0296415 A1* | 11/2010 | Sachs et al. | 370/254 |
| 2011/0110300 A1* | 5/2011 | Sachs | H04W 48/18 370/328 |
| 2011/0170481 A1* | 7/2011 | Gomes et al. | 370/328 |
| 2012/0122458 A1* | 5/2012 | Jokinen et al. | 455/437 |
| 2012/0196644 A1* | 8/2012 | Scherzer et al. | 455/524 |
| 2013/0012182 A1* | 1/2013 | Liao | 455/418 |
| 2013/0012260 A1 | 1/2013 | Salkintzis et al. | |
| 2013/0073710 A1* | 3/2013 | Lee | 709/223 |
| 2013/0265985 A1* | 10/2013 | Salkintzis | 370/331 |
| 2014/0113628 A1* | 4/2014 | Sundararajan et al. | 455/435.2 |
| 2014/0169197 A1* | 6/2014 | Damnjanovic et al. | 370/252 |

FOREIGN PATENT DOCUMENTS

| | | |
|---|---|---|
| WO | 2012/055769 A1 | 5/2012 |
| WO | 2012092935 A1 | 7/2012 |
| WO | 2012/131655 A1 | 10/2012 |
| WO | 2012131655 A1 | 10/2012 |
| WO | 2013/022220 A1 | 2/2013 |
| WO | 2013022220 A1 | 2/2013 |

* cited by examiner

| Value | Description |
|---|---|
| 0 | Reserved |
| 1 | 3GPP |
| 2 | Reserved |
| 3 | WLAN |
| 4 | WiMax |
| 5-255 | Reserved |

| 1 | 3GPP |
|---|---|
| 2 | Reserved |
| 3 | WLAN |
| 4 | WiMax |
| 5 | 802.11ad |
| 6 | 802.11ac |
| 7 | 802.11n |
| 8 | E-UTRAN |
| 9 | 802.11g |
| 10 | 802.11b |
| 11 | 802.11a |
| 12 | UTRAN |
| 13 | GERAN |
| 14-255 | Reserved |

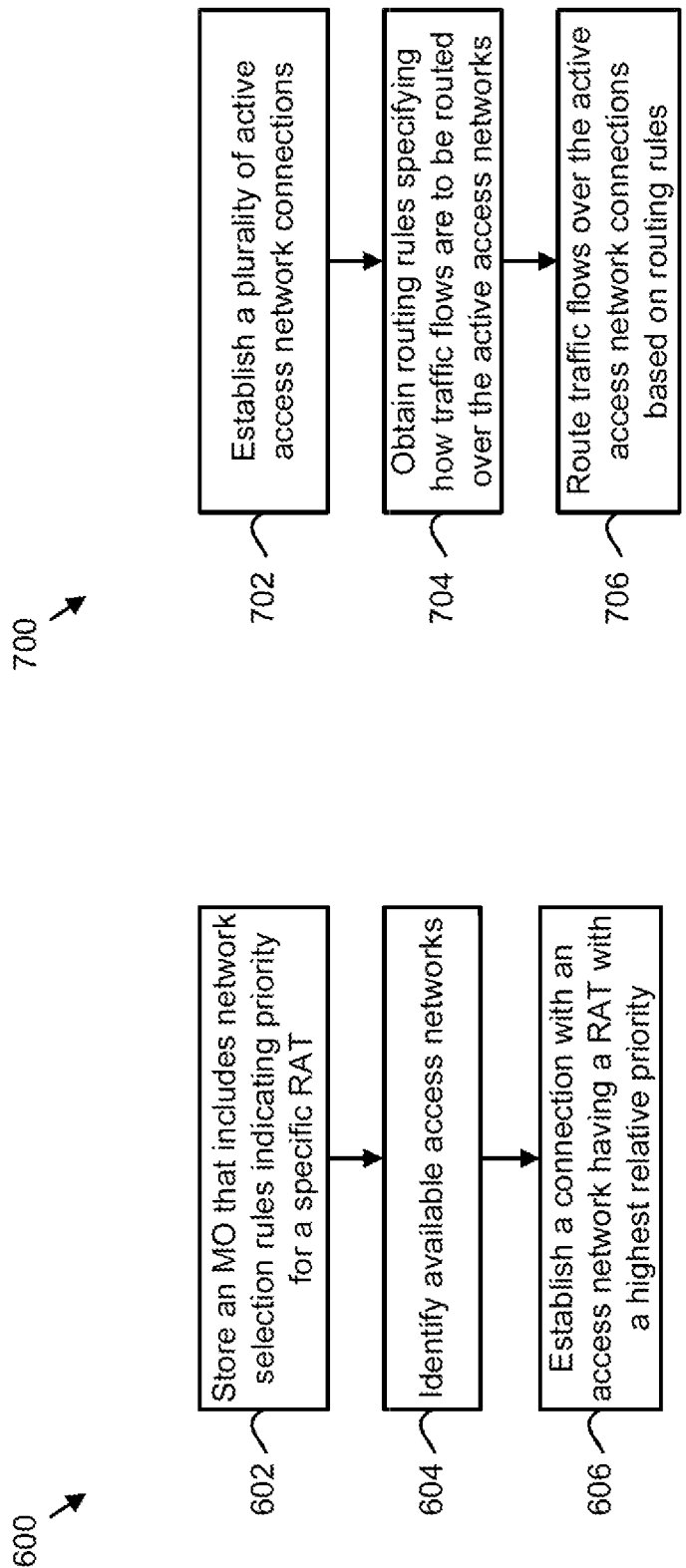

SYSTEMS AND METHODS FOR ACCESS NETWORK SELECTION AND TRAFFIC ROUTING

RELATED APPLICATION

This application claims the benefit under 35 U.S.C. § 119(e) of U.S. Provisional Application No. 61/768,330, filed Feb. 22, 2013, which is incorporated by reference herein in its entirety.

TECHNICAL FIELD

The present disclosure relates to traffic offloading and more particularly relates to wireless traffic offload without service disruption.

BRIEF DESCRIPTION OF THE DRAWINGS

FIG. 6 is a schematic diagram illustrating a method for network selection consistent with embodiments disclosed herein.

FIG. 7 is a schematic diagram illustrating a method for traffic routing consistent with embodiments disclosed herein.

DETAILED DESCRIPTION OF PREFERRED EMBODIMENTS

Figure 1:
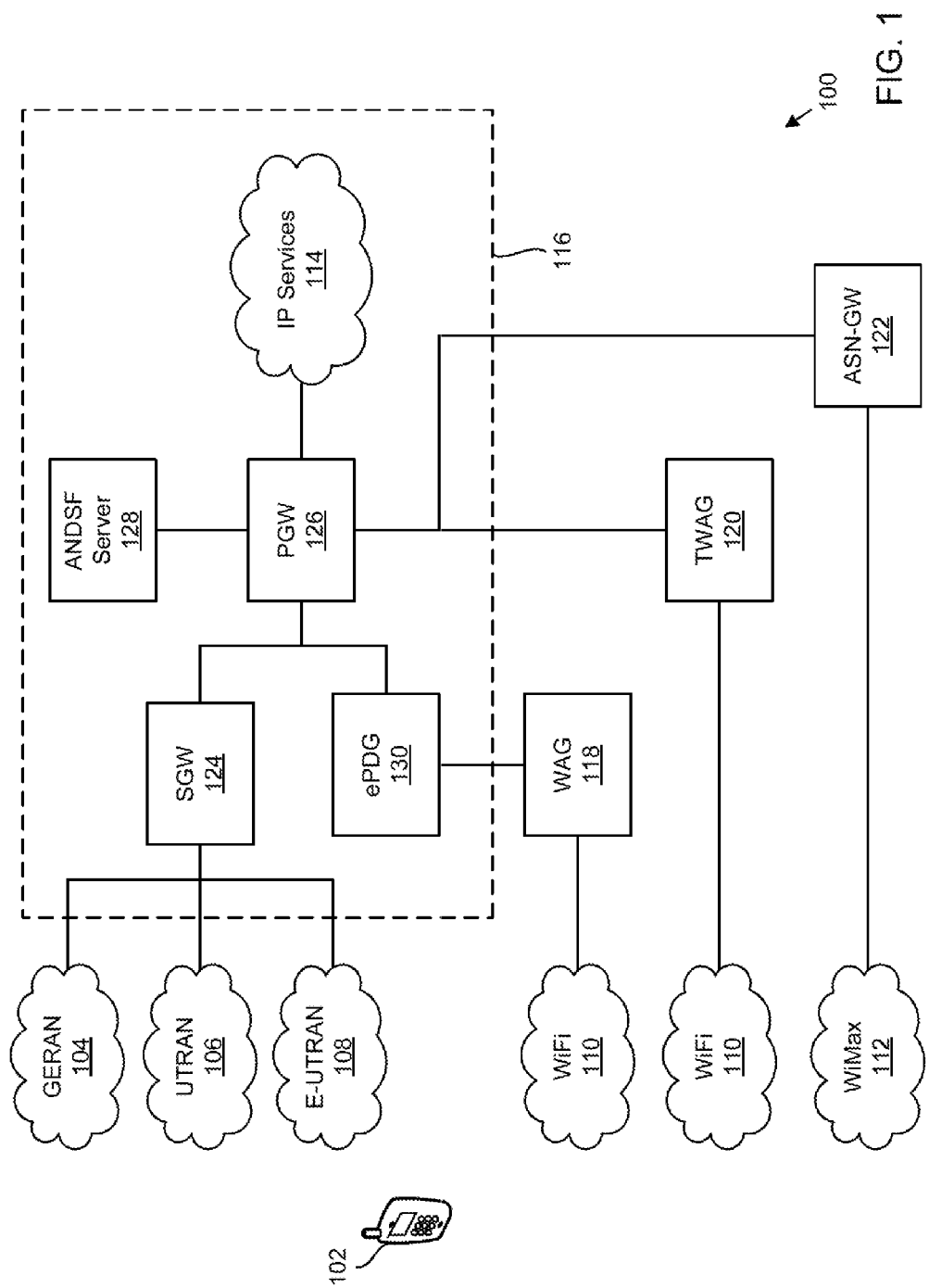
FIG. 1 is a schematic diagram illustrating a communication system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

A common goal in cellular wireless networks (such as 3GPP networks) includes efficient use of licensed bandwidth. One way that a UE, or other mobile wireless devices, helps to reduce usage of licensed bandwidth is through offloading. For example, a UE is configured to connect to other types of networks in addition or alternatively to a cellular wireless network through which at least some data may be offloaded. In one embodiment, a UE is configured to connect to a wireless local area network (WLAN) (such as a Wi-Fi network) and route traffic flows over the WLAN to reduce the usage of bandwidth on a 3GPP or other cellular wireless network.

In the Evolved Packet System (EPS) within 3GPP, the access network detection and selection function (ANDSF) has defined mechanisms that enable devices to determine which access technology is preferable for connection and/or preferable for certain IP traffic under specific conditions, e.g., through the use of an inter-system mobility policy (ISMP) and/or inter-system routing policy (ISRP). At present ANDSF does not provide for mechanisms to indicate preferences with granularity at the 3GPP radio access technology (RAT) level within network policies. This restricts the ability for an operator to provide policies that favor a specific 3GPP RAT over another one with reference to another non-3GPP specific RAT preference.

This issue is described based on the following scenario. A multi-mode UE supporting 3GPP RATs and WLAN may be connected to both a 3GPP access network and a WLAN access network. When RAT mobility occurs, the UE uses ANDSF policies to determine whether IP traffic should be routed over the 3GPP access or over WLAN. The UE applies the ANDSF policies that indicate that for certain IP traffic a 3GPP access is preferable to WLAN independently of the 3GPP RAT type. In this scenario, the operator (through the ANDSF policies) may further determine that, for certain IP traffic, WLAN is preferable compared to certain 3GPP access technologies (e.g., for certain traffic, WLAN may be preferable to UTRAN) but other 3GPP access technologies (e.g., E-UTRAN) are preferable to WLAN. In this scenario, the operator may desire to indicate to the UE which 3GPP RAT types are preferable to WLAN and for which 3GPP RAT types WLAN is preferable.

The present disclosure proposes to indicate the specific 3GPP RATs within the ANDSF rules for ISMP and/or ISRP or other network selection policies so that the operator and/or UE can distinguish between them. The inclusion of the specific 3GPP RATs, or other RATs, allows for increased granularity and control based on these aspects and can lead to better quality of service and data offloading.

In one embodiment, a UE is configured to store an ANDSF management object (MO). The ANDSF MO may include network selection rules indicating relative priority for access networks based on a specific RAT. The UE is configured to identify one or more available access networks. The UE is configured to establish a connection with a RAT of the one or more available access networks. In one embodiment, an access network comprises a network for providing wireless access and implements one or more different types of RAT. Thus, the UE may connect to the access network using any of one or more available and RAT types implemented by the access network. The UE establishes the connection with an available access network having a RAT type with a highest relative priority based on the network selection rules.

FIG. 1 is a schematic diagram of a communication system 100 for providing wireless communication services to a UE 102 or other mobile wireless device. The system 100 includes a plurality of RANs 104-112 through which the UE 102 may access IP services 114 or other data services, such as voice services or the Internet. Specifically, the system 100 includes a global system for mobile communications (GSM) enhanced data rates for GSM evolution (EDGE) RAN (GERAN) 104, a UTRAN 106, and an E-UTRAN 108, which provide access to communication services through a core network 116. Each of the RANs 104-108 operates according to a specific 3GPP RAT. For example, the GERAN 104 implements GSM and/or EDGE RAT, the UTRAN 106 implements universal mobile telecommunication system (UMTS) RAT or other 3GPP RAT, and the E-UTRAN 108 implements LTE RAT.

The system 100 also includes trusted and untrusted Wi-Fi RAN 110s and a WiMAX RAN 112, which connect to the core network 116 via a wireless access gateway (WAG) 118, a trusted WAG (TWAG) 120, and an access service network gateway (ASN-GW) 122, respectively. The Wi-Fi RANs 110 may include WLANs that implement 802.11a, 802.11g, 802.11n, 802.11ac, and/or any other 802.11 RAT. The WiMAX RAN 112 may implement any version of the 802.16 RAT (e.g. 802.16e or other 802.16 version).

Each of the RANs 104-112 includes one or more base stations or other infrastructure for wirelessly communicating with the UE 102 and providing access to communication services. For example, the E-UTRAN 108 includes one or more eNBs, which are configured to wirelessly communicate with the UE 102.

The core network 116 includes a serving gateway (SGW) 124, a packet data network (PDN) gateway (PGW) 126, an ANDSF server 128, and an enhanced packet data gateway ePDG 130. The PGW 126 is connected to the WAG 118 via the ePDG 130 using the S2b interface (for the case of untrusted access) and to the TWAG 120 and ASN-GW 122 using the S2a interface (for the case of trusted access). One of skill in the art will recognize that numerous other components and functions may be included or implemented in the core network 116. The ANDSF server 128 is configured to assist UE 102 to discover and connect to non-3GPP access networks, such as the Wi-Fi RAN 110 and/or the WiMAX RAN 112. The ANDSF server 128 stores an ANDSF MO that includes policies for connecting and routing traffic over a 3GPP or an alternative access network. The ANDSF MO is described in 3GPP Technical Specification (TS) 24.312 version 11 (Oct. 8, 2012), which is available to the public. Policies within the ANDSF MO may indicate when connection to alternative networks is appropriate and/or when traffic offloading should be performed. In one embodiment, a cell of a cellular network (such as a cell of one of the 3GPP RANs 104, 106. 108) may have a corresponding list of Wi-Fi hotspots or WiMAX base stations in the same area. The UE 102 may use this list to connect to one of the available Wi-Fi hotspots or WiMAX base stations and/or route traffic over these connections.

Figure 2:
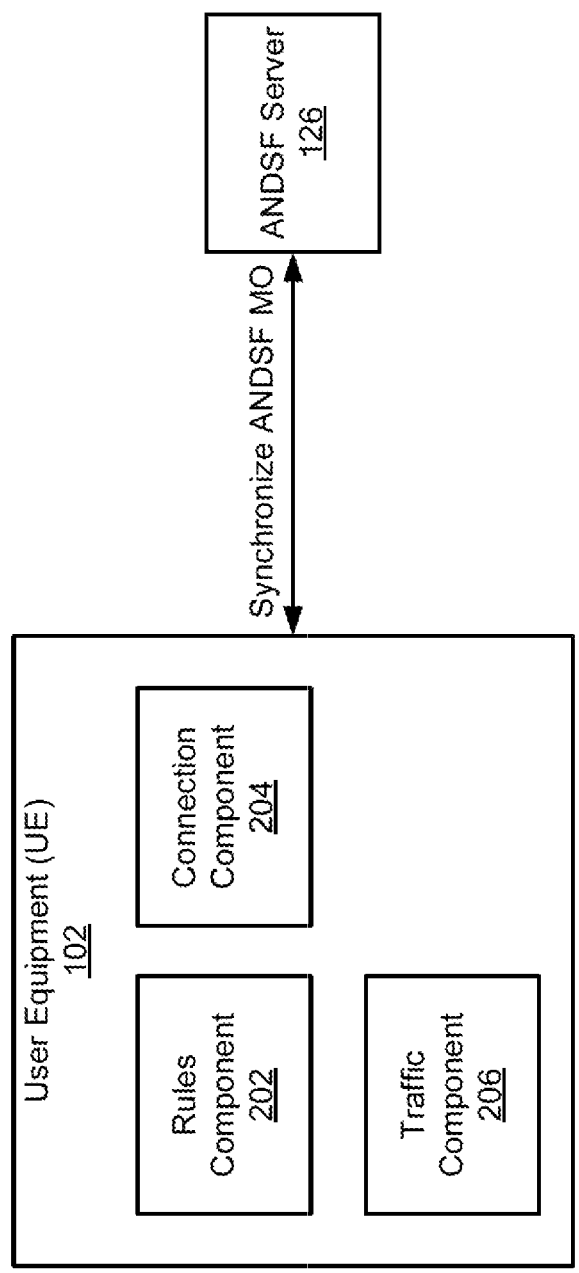
FIG. 2 is a schematic diagram illustrating user equipment (UE) and an ANDSF server for network selection and traffic routing based on radio access technology consistent with embodiments disclosed herein.

FIG. 2 is a schematic block diagram illustrating a UE 102 in communication with an ANDSF server 128. The UE 102 includes a rules component 202, a connection component 204, and a traffic component 206. The components 202-206 are given by way of example only. In some embodiments, additional or fewer components may be included. In fact, some embodiments may include only one or any combination of two or more of the illustrated components 202, 204, 206.

The rules component 202 is configured to store rules for network connections and/or traffic routing. The rules component 202 may store information including a list of networks alternative to a cellular network (e.g., alternative to a 3GPP network), which is available for offloading or traffic routing by the UE 102. In one embodiment, the rules indicate a priority for different types of networks based on a specific RAT implemented or included in the network. For example, some types of 3GPP RAT may be preferable to a WLAN connection while another type of 3GPP RAT may not be. The rule priorities may indicate priorities for network selection and/or traffic routing. The rule priorities may indicate priorities based on types of networks and different types of RATs.

The rules stored by the rules component 202 may be obtained in a variety of manners. In one embodiment, the rules component 202 may store pre-provisioned rules. For example, the rules stored by the rules component may be stored during manufacturing or initial programming of the UE 102. In one embodiment, the rules component 202 may be configured to synchronize the rules with a network component. For example, the rules component 202 and ANDSF server 128 may synchronize at least a portion of an MO stored by the UE 102 so that the UE 102 has the same version as a local ANDSF server 128. The rules component 202 may store the rules by storing at least a portion of the MO. In one embodiment, the MO may be synchronized with the ANDSF server 128 at activation of the UE 102. In one embodiment, the MO may be synchronized dynamically so that the rules component 202 stores an up-to-date version of the MO. For example, the ANDSF server 128 may send a message to the UE 102 indicating that the MO has been changed or updated and the UE 102 may connect to the ANDSF server 128 to synchronize the MO. In one embodiment, only portions of the MO that have changed are sent to the UE 102 in order to save bandwidth and/or the MO may be updated over an alternative network connection, such as over a Wi-Fi RAN 110 or WiMAX RAN 112.

The rules stored by the rules component 202 may include network selection rules and/or traffic routing rules. In one embodiment, the rules component 202 is configured to obtain and/or store network selection rules indicating relative priority for access networks based on a specific RAT. For example, the network selection rules may indicate that a 3GPP access network with a first RAT type has a higher priority than a WLAN access network. Similarly, 3GPP access networks may have different relative priorities to the WLAN. For example, an access network that implements LIE technology may be preferable to WLAN, while an access network that implements UMTS may have a lower priority than the WLAN.

In one embodiment, the rules component 202 is configured to obtain and/or store routing rules that indicate how IP traffic should be routed. For example, some UE 102 are capable of simultaneously maintaining connections with a 3GPP-compliant network and a non-3GPP-compliant network. In one embodiment, the routing rules may indicate whether IP traffic in general or a specific type of IP traffic should be routed over a WLAN or a cellular network based on the RAT implemented by the connected networks.

In one embodiment, the rules component 202 may store rules that indicate a priority for a specific 3GPP RAT. For example, the rules component 202 may indicate specific preferences for one or more of an LIE RAT, a GSM RAT, and a UMTS RAT. In one embodiment, the priority for two or more specific types of LIE RATs is separately prioritized. For example, the network selection rules may indicate that a first 3GPP access network with a first RAT type has a higher priority than a WLAN, while a second 3GPP access network with a second RAT type has a lower priority than the WLAN. Additionally, the rules may indicate priorities based on a cell type of a 3GPP RAN or another RAN. For example, the rules may indicate a priority for one or more of high-speed packet access (HSPA), evolved HSPA (HSPA+), HSPA+ Advanced, UTRAN, or other cell type. Furthermore, priorities for different types of RATs may be assigned based on a type of IP traffic. For example, voice services may be preferably routed over a cellular network, while web browsing may preferably be routed over a WLAN or WiMAX network.

In one embodiment, the rules component 202 may store rules that indicate a priority for a specific WLAN RAT. For example, the rules component 202 may indicate specific preferences for one or more of an 802.11a standard, an 802.11g standard, an 802.11n standard, an 802.11ac standard, or any other 802.11 standard or version. Similarly, the rules component may store rules that indicate a priority for a specific WiMAX RAT. In one embodiment, the priority for two or more specific types of WLAN RATS, or any other RATs, is separately prioritized. For example, the network selection rules may indicate that a first WLAN access network with a first RAT type has a higher priority than a 3GPP access network, while a second WLAN access network with a second RAT type has a lower priority than the 3GPP access network. Furthermore, priorities for different types of RAT types may be assigned based on a type of IP traffic. For example, voice services may he preferably routed over cellular RANs 104-108, while web browsing may preferably be routed over a WLAN RAN 110 or WiMAX RAN 112.

The rules component 202 may obtain and/or store rules within an MO. For example, the rules may be obtained and/or stored in a structure comprising an ANDSF MO. In one embodiment, the MO may be open mobile alliance (OMA) device management (DM) compliant. In one embodiment, the rules and/or policies within the MO may be stored or indicated in an extensible markup language (XML) format.

Figure 3A:
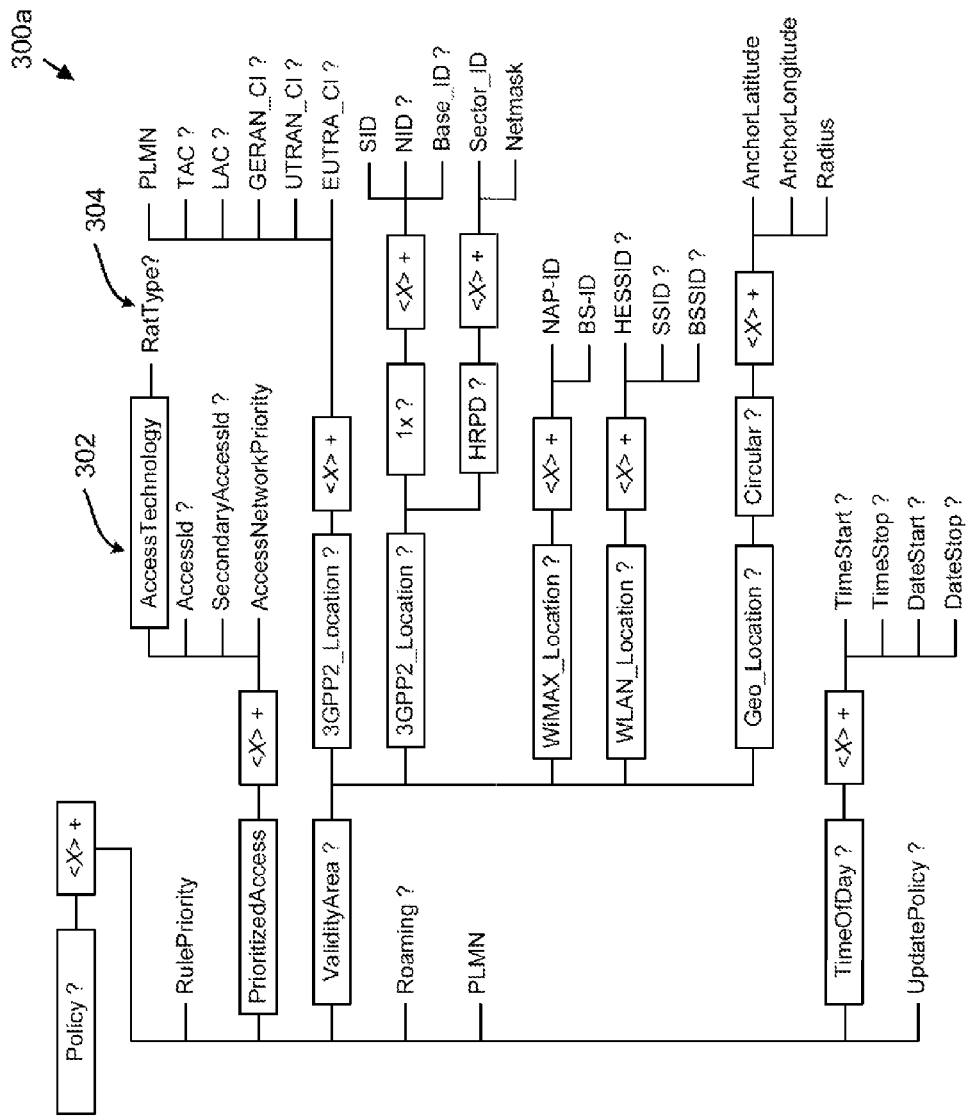
FIG. 3A is a schematic block diagram of an inter-system mobility policy (ISMP) consistent with embodiments disclosed herein.
Figure 3B:
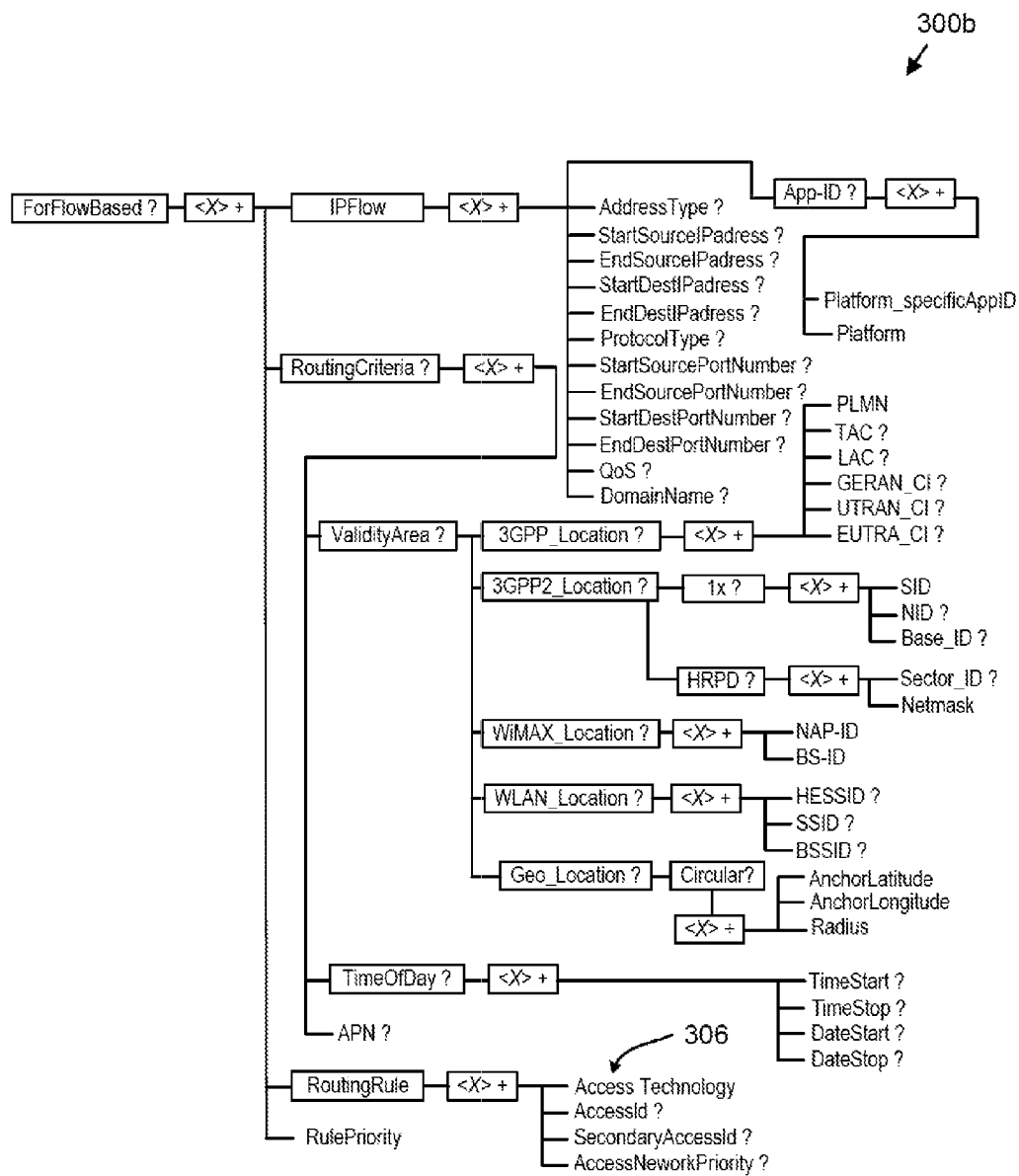
FIG. 3B is a schematic block diagram of an inter-system routing policy (ISRP) consistent with embodiments disclosed herein.

In one embodiment, an ANDSF MO includes preferences in an XML format. For example, the policies and preferences may be organized in a branch and leaf structure formatted according to XML. The preferences may be included in one or more of an ISMP and an ISRP. FIGS. 3A and 3B graphically illustrate example branch and leaf structure of an MO in an XML format. Specifically, FIG. 3A graphically illustrates an ISMP 300a that includes preferences for a specific RAT and FIG. 3B graphically illustrates an ISRP 300b that includes preferences for a specific RAT. Each of the ISMP 300a and ISRP 300b is graphically illustrated with branch nodes and leaf nodes. The leaf nodes may include values indicating preferences or priorities for network selection and/or traffic routing.

Figure 4:
FIG. 4 is a table illustrating values for a leaf node of the ISMP or ISRP of FIG. 3A and/or FIG. 3B consistent with embodiments disclosed herein.

FIG. 4 illustrates a table 400 from 3GPP TS 24.312 indicating possible values for a leaf node. The table 400 includes values that correspond to 3GPP, WLAN, and WiMAX networks as well as Reserved values. Thus, based on a value of a leaf node (or a branch node), an MO can indicate preferences to a UE 102. However, the table 400 does not include values for specific RAT types of 3GPP, WLAN, or WiMAX networks or cells. Thus, an operator would not be able to specify preferences regarding a specific 3GPP RAT, for example. In one embodiment, the preference for a 3GPP RAT, or any other specific RAT type, may be included within the table 400 and/or the ISMP 300a and ISRP 300b. For example, the table 400 may be modified to include values for GERAN, UTRAN, and E-UTRAN, which are specific 3GPP RAT types. Similarly, the table 400 may be modified to include RAT types for other networks, such as WLANs and WiMAX, or specify cell types within the same RAT, such as cell types within 3GPP. Example cell types for 3GPP may include HSPA, or the like.

Figure 5:
FIG. 5 is another table illustrating values for a leaf node of the ISMP or ISRP of FIG. 3A and/or FIG. 3B consistent with embodiments disclosed herein.

FIG. 5 illustrates a table 500 that includes values for specific 3GPP RAT types and WLAN RAT types. For example, the table 500 has been extended to use reserved values for specific RAT corresponding to 3GPP and WLAN but has maintained the corresponding values 1-4 as in table 400 of FIG. 4 for backwards compatibility. The depicted values and enumerated RAT types are given by way of example. In some embodiments, fewer or additional RAT types may be listed. For example, the table 500 may be further extended to capture other RAT types such as for LTE advance or LTE direct, or for new 3GPP RAT types to be developed.

In one embodiment, the table 500 specifies possible values for a leaf node within the ISMP 300a and/or the ISRP 300b of FIGS. 3A and 3B, or other branch of the ANDSF MO. For example, the table 500 may illustrate values for leaf nodes or other nodes in a WLAN selection policy (WLANSP) branch. In one embodiment, the WLANSP branch is a branch separate from the ISMP and ISRP and specifies selection policies for WLAN access networks and/or WLAN RAT types. In one embodiment, the table 500 specifies values for the sub-leaf node 304 of FIG. 3A. For example, the table 500 may define values for <X>/Policy/ <X>/PrioritizedAccess/<X>/AccessTechnology/<X>/Rat-Type? within the XML format of the MO. In one embodiment, the table 500 specifies values for the leaf node 306 of FIG. 3B. For example, the table 500 may define values in the XML format of the MO to be <X>/ISRP/<X>/ForFlow-Based/<X>/RoutingRule/<X>/Access Technology/. Similarly, in other embodiments, values for specific RAT types may be included as a leaf node in the ISMP at <X>/Policy/ <X>/PrioritizedAccess/<X>/AccessTechnology/ or within the ISRP in a sub-leaf node at <X>/ISRP/<X>/ForFlow-Based/<X>/RoutingRule/<X>/Access Technology/<X>/ RatType? (not shown). Thus, the RAT types may be indicated within the same or separate leaf nodes or sub leaf nodes and may be compared to determine a highest-priority access network for network selection or traffic routing. For example, the 3GPP RAT type could be added as a sub-leaf node depending from a leaf node having one of the value specified in table 400 of FIG. 4 and the WLAN preference can be compared to the sub-leaf node.

As will be understood by one skilled in the art, the locations within the MO as discussed above and illustrated are given by way of example only. Any other additional or alternate locations within the MO may be desirable depending on the embodiment.

The connection component 202 is configured to establish one or more active access network connections. In one embodiment; the connection component 202 is configured to maintain a plurality of active access network connections at substantially the same time. For example, the connection component 202 may be configured to establish and/or maintain a connection with a 3GPP-compliant network and a non-3GPP-compliant network. Connections with more than one access network and/or types of access networks may allow for optimized traffic routing because some types of traffic may be preferably routed over by a 3GPP or other cellular network, while other types of traffic may be preferably routed over a Wi-Fi or other non-cellular network to reduce usage of licensed spectrum.

In one embodiment, the connection component 202 is configured to identify one or more available access networks. The connection component 202 may identify the available access networks based on a list of available networks stored by the rules component 202. The connection component 202 may identify available access networks based on rules stored by the rules component 202. For example, the rules may include rules and policies within an MO stored by the rules component 202 and/or provided by an ANDSF server 128. Based on the available access networks, as well as network selection priorities within the MO, the connection component 202 may select and/or reselect an available access network for connection. In one embodiment, the connection component 202 may select or reselect a network based on the specific RAT type and priorities for RAT types indicated by the network selection rules. For example, the priority for different RAT types may be included in an ISMP and/or ISRP of an ANDSF MO stored by the rules component 202. The connection component 204 may establish a connection with the highest-priority access network(s). In one embodiment establishing the connection with the access network includes reselecting a new access network by releasing an old access network and establishing a connection to the new access network.

The traffic component 206 is configured to route traffic flows over the active access networks based on routing rules stored by the rules component 202. For example, the traffic component 206 may route IP traffic or other traffic flows for the UE 102 over one of two or more active access network connections based on an ISRP and/or ISMP of an ANDSF MO stored by the rules component 202. In one embodiment, the traffic component 206 routes traffic flows that include a first traffic flow and a second traffic flow over different active access network connections. For example, the connection component 204 may establish and/or maintain two or more active access network connections and the traffic component 206 may route the first traffic flow over a first active access network and the second traffic flow over a second active access network.

The ANDSF server 128 is configured to store and provide network selection and/or routing rules to the UE 102. In one embodiment, the ANDSF server 128 is configured to synchronize an ANDSF MO with the UE 102 at activation or in a dynamic manner. In one embodiment, the ANDSF server 128 stores an ANDSF MO indicating network selection rules for a UE 102. In one embodiment, the ANDSF MO may indicate network selection and/or routing priority rules for a plurality of UEs 102 including all UEs 102 within a geographic area and connected to a 3GPP network. In one embodiment, the ANDSF server 128 may store multiple ANDSF MOs for different UEs 102 and/or for different types of UEs 102. The ANDSF MO may include an ISMP, an ISRP or other rules or policies for controlling network selection and traffic routing on the UE 102. The ANDSF MO gray be OMA DM compliant.

In one embodiment, the ANDSF server 128 is configured to establish communication with a UE 102. For example, the ANDSF server 128 may receive a request from a UE 102 to connect and update an MO for the UE 102. In one embodiment, the UE 102 may request updating of the MO in response to the ANDSF server 128 indicating that the MO has changed.

The ANDSF server 128 may synchronize at least a portion of the ANDSF MO with the UE 102. For example, the ANDSF server 128 may synchronize at least a portion of the MO that indicates a preference for access networks having a specific RAT. In one embodiment, the ANDSF server 128 may only provide portions of the ANDSF MO that are different from an ANDSF MO stored by the UE 102.

FIG. 6 is a schematic flow-chart diagram illustrating a method 600 for network selection. The method 600 may be performed by a UE 102 or other mobile wireless device.

The method 600 begins and the rules component 202 stores 602 an MO that includes network selection rules. The MO may include an ANDSF MO and may include an ISMP. In one embodiment, the network selection rules indicate relative priority for access networks based on a specific RAT.

A connection component 204 identifies 604 available access networks. In one embodiment, the connection component 204 identifies 604 available access networks based on a list of access networks geographically proximate to the UE 102 specified in the MO. In one embodiment, the available access networks include 3GPP-compliant and non-3GPP-compliant networks.

The connection component 204 establishes 606 a connection with an access network based on the network selection rules. In one embodiment, the connection component 204 establishes 606 the connection with an access network that has a RAT with a highest relative priority to other available access networks.

FIG. 7 is a schematic flow-chart diagram illustrating a method 700 for traffic routing. The method 700 may be performed by a UE 102 or other mobile wireless device.

The method 700 begins and the connection component 204 establishes 702 a plurality of active access network connections. For example, the connection component 204 may establish 702 active access network connections with at least one cellular network and one non-cellular network. Similarly, the connection component 204 may establish 702 active access network connections with at least one 3GPP-compliant access network and at least one non-3GPP-compliant network. In one embodiment, the connection component 204 establishes 702 the active access network based on network selection rules stored by a rules component 202. For example, the connection component 204 may establish 702 the active access network connections as discussed above in relation to the method 600 of FIG. 6.

The rules component 202 obtains 704 routing rules that specify how traffic flows are to be routed over the active access networks. For example, the rules component 202 may obtain 704 and store an ISMP. The routing rules may indicate a specific access technology preference (such as RAT type preference) for a specific type of traffic flow or traffic flows in general.

The routing component 206 routes 706 the traffic flows based on the routing rules. In one embodiment, the routing component 206 may route a first traffic flow over a 3GPP access network and a second traffic flow over a second non-3GPP access network. In one embodiment, the routing component 206 routes 706 the traffic flows based on a specific access technology (such as RAT type) of the access networks and/or a type of traffic flow.

Figure 8:
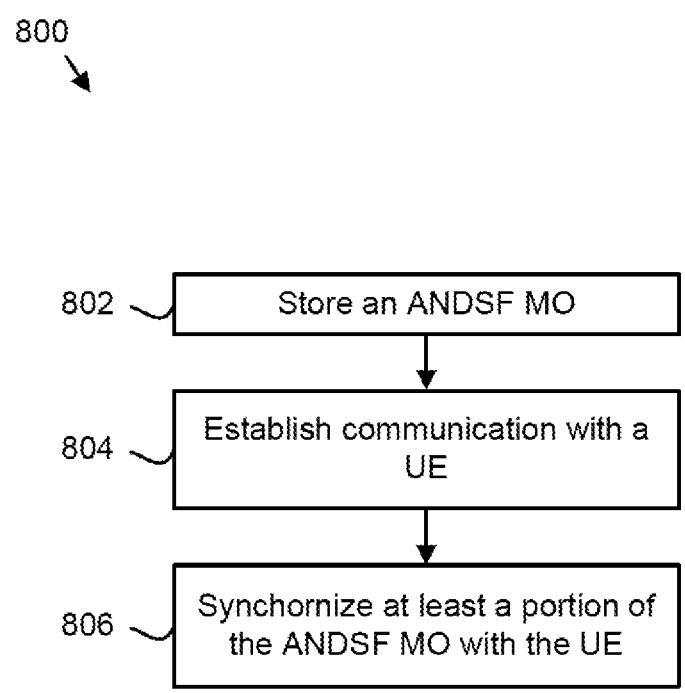
FIG. 8 is a schematic diagram illustrating a method for synchronizing network selection and/or traffic routing rules consistent with embodiments disclosed herein.

FIG. 8 is a schematic flow-chart diagram illustrating a method 800 for synchronizing network selection rules and/or routing rules with a UE 102. The method 700 may be performed by an ANDSF server 128 or another network infrastructure component.

The method 800 begins and the ANDSF server 128 stores 802 an ANDSF MO that indicates network selection rules for a UE 102 or other mobile wireless device. The ANDSF MO may include ISMP and/or ISRP that indicate preferences based on a specific RAT type of access networks.

The ANDSF server 128 establishes 804 communication with a UE 102. The UE 102 may include a UE 102 within a geographic area corresponding to the ANDSF server 128. The ANDSF server 128 synchronizes 806 at least a portion of the ANDSF MO with the TIE 102. For example, the UE 102 may store a copy of the MO at the UE 102. The ANDSF server 128 may synchronize 806 the ANDSF MO with the UE 102 in response to an update or a change being made to the ANDSF MO. In one embodiment, the portion of the ANDSF MO synchronized with the UE 102 includes preferences for access networks having a specific RAT. For example, the specific RAT may include a specific 3GPP RAT type and/or a specific WLAN RAT type.

Figure 9:
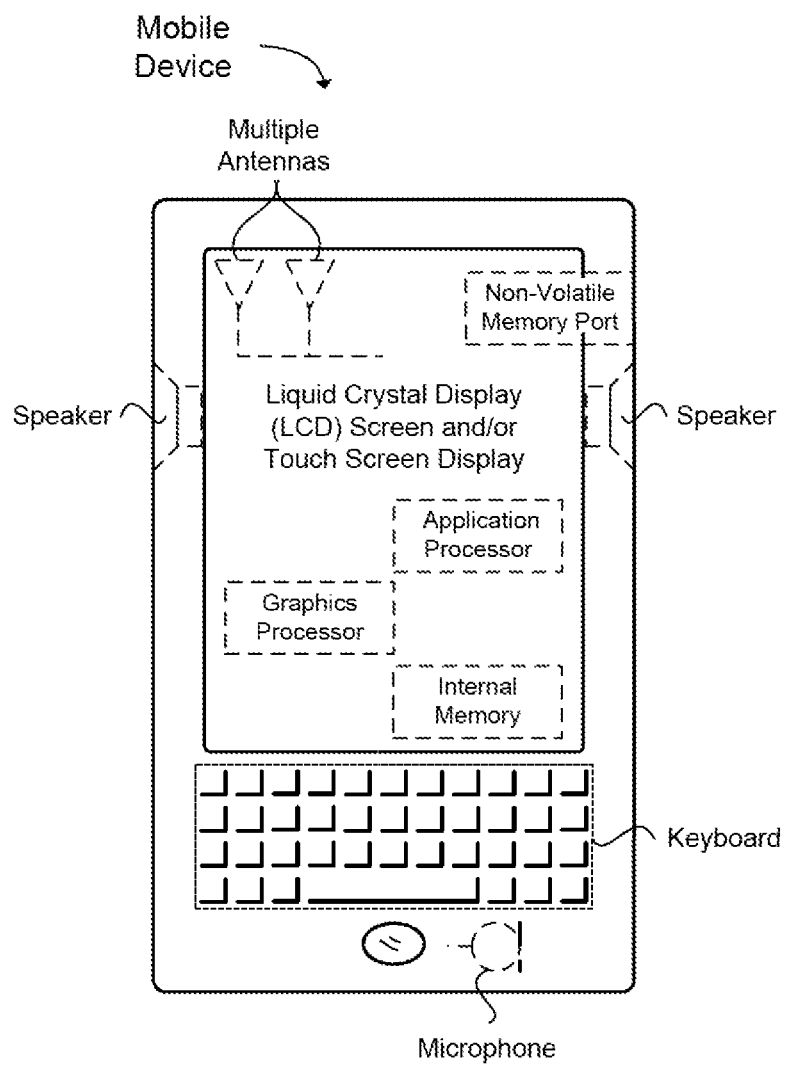
FIG. 9 is a schematic diagram of a mobile device consistent with embodiments disclosed herein.

FIG. 9 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE that is configured to store an ANDSF MO. The ANDSF MO includes network selection rules indicating relative priority for access networks based on a specific RAT type. The UE is configured to identify one or more available access networks. The UE is configured to establish a connection with a RAT of the one or more available access networks. The access network comprises a RAT with a highest relative priority based on the network selection rules.

In Example 2, the network selection rules of Example 1 can optionally indicate that a first 3GPP access network with a first RAT type has a higher priority than a non-3GPP access network and that a second 3GPP access network with a second RAT type has a lower priority than the non-3GPP access network.

In Example 3, the non-3GPP access network of Example 2 can optionally include WLAN.

In Example 4, the UE establishing the connection with the access network in Examples 1-3 can optionally include reselecting a new access network by releasing an old access network and establishing a connection to the new access network.

In Example 5, the network selection rules of Examples 1-4 can optionally indicate a priority for a 3GPP RAT.

In Example 6, indicating a priority for a 3GPP RAT in Examples 1-5 can optionally include indicating a priority for one or more of a UTRAN, an E-UTRAN, and a GERAN.

In Example 7, the network selection rules of Examples 1-6 can optionally include rules indicating a priority for a WLAN RAT.

In Example 8, the network selection rules of Examples 1-7 can optionally include an ISMP.

In Example 9, the network selection rules of Examples 1-8 can optionally include a WLANSP.

In Example 10, the UE of Examples 1-9 can optionally be configured to dynamically synchronize the ANDSF MO with an ANDSF server.

Example 11 is a wireless mobile device that includes a connection component, a rules component, and a traffic component. The connection component is configured to establish a plurality of active access network connections. The active access network connections include connections to a 3GPP-compliant network and a non-3GPP-compliant network. The rules component is configured to obtain routing rules that specify how traffic flows are to be routed over the active access network connections based on the specific access technology of one or more of the 3GPP-compliant network and the non-3GPP-compliant network. The traffic component is configured to route traffic flows over the active access network connections based on the routing rules.

In Example 12, the traffic component of Example 11 can optionally route traffic flows that include a first traffic flow and a second traffic flow over active access networks that include a first active access network and a second access network. The traffic component is optionally configured to route the first traffic flow over the first active access network and route the second traffic flow over the second active access network based on the routing rules.

In Example 13, the rules component of Examples 11-12 can optionally obtain routing rules that indicate relative priority for access networks based on a RAT type.

In Example 14, the rules component of Examples 11-13 can optionally obtain routing rules that indicate relative priority for access networks based on a WLAN RAT.

In Example 15, the rules that indicate relative priority for access networks based on a WLAN RAT of Example 14 can optionally indicate a priority for one or more of an 802.11a standard, an 802.11b standard, an 802.11g standard, an 802.11n standard, an 802.11ac standard, and an 802.11ad standard.

In Example 16, the rules component of Examples 11-15 can optionally obtain routing rules that indicate relative priority for access networks based on a cell type.

In Example 17, the rules that indicate relative priority for access networks based on a cell type of Example 16 can optionally indicate a priority for one or more of HSPA, HSPA+, HSPA+ Advanced, and UTRAN.

In Example 18, the rules component of Examples 11-17 can optionally obtain routing rules that include an ISRP.

Example 19 is a computer program product that include a computer-readable storage medium that stores program code for causing one or more processors to perform a method. The method includes storing an ANDSF MO indicating network selection rules for a mobile wireless device. The method include establishing communication with the mobile wireless device. The method includes synchronizing at least a portion of the ANDSF MO with the mobile wireless device. The at least a portion of the ANDSF MO indicates a preference for access networks having a specific RAT.

In Example 20, the network selections rules of Example 19 can optionally include an ISMP.

In Example 21, the network selections rules of Examples 19-20 can optionally include an ISRP.

In Example 22, the ANDSF MO of Examples 19-21 is optionally OMA DM compliant.

In Example 23, the ANDSF MO of Examples 19-22 can optionally include an XML data scheme with leaves indicating the specific RAT.

In Example 24, the ANDSF MO of Examples 19-23 can optionally indicate a relative priority for the specific RAT comprising one or more of a 3GPP RAT and a WLAN RAT.

Example 25 is a method for network selection. The method includes storing an ANDSF MO. The ANDSF MO includes network selection rules indicating relative priority for access networks based on a specific RAT types. The method includes identifying one or more available access networks. The method includes establishing a connection with a RAT of the one or more available access networks. The access network includes a RAT with a highest relative priority based on the network selection rules.

In Example 26, the network selection rules of Example 25 can optionally indicate that a first 3GPP access network with a first RAT type has a higher priority than a non-3GPP access network and that a second 3GPP access network with a second RAT type has a lower priority than the non-3GPP access network.

In Example 27, the non-3GPP access network of Example 26 can optionally include a WLAN.

In Example 28, establishing the connection With the access network in Examples 25-27 can optionally include reselecting a new access network by releasing an old access releasing network and establishing a connection to the new access network.

In Example 29, the network selection rules of Examples 25-28 can optionally indicate relative priority for access networks comprises indicating a priority for a 3GPP RAT.

In Example 30, indicating relative priority for access networks in Examples 25-29 can optionally include indicating a priority for one or more of a UTRAN, an E-UTRAN, and a GERAN.

In Example 31, the network selection rules of Examples 25-30 can optionally include rules indicating a priority for a WLAN RAT.

In Example 32, the network selection rules of Examples 25-31 can optionally include an ISMP.

In Example 33, the network selection rules of Examples 25-32 can optionally include a WLANSP.

In Example 34, the method of Examples 25-33 can optionally include dynamically synchronizing the ANDSF MO with an ANDSF server.

Example 35 is method for traffic routing. The method includes establishing a plurality of active access network connections. The active access network connections include connections to a 3GPP-compliant network and a non-3GPP-compliant network. The method includes obtaining routing rules that specify how traffic flows are to be routed over the active access network connections based on the specific access technology of one or more of the 3GPP-compliant network and the non-3GPP-compliant network. The method includes routing traffic flows over the active access network connections based on the routing rules.

In Example 36, routing traffic flows in Example 35 can optionally include routing a first traffic flow and a second traffic flow over active access networks that include a first active access network and a second access network. Routing traffic flows can optionally include routing the first traffic flow over the first active access network and routing the second traffic flow over the second active access network based on the routing rules.

In Example 37, obtaining routing rules in Examples 35-36 can optionally include obtaining routing rules that indicate relative priority for access networks based on a RAT type.

In Example 38, obtaining routing rules in Examples 35-37 can optionally include obtaining routing rules that indicate relative priority for access networks based on a WLAN RAT.

In Example 39, the rules that indicate relative priority for access networks based on a WLAN RAT of Example 38 can optionally indicate a priority for one or more of an 802.11a standard, an 802.11b standard, an 802.11g standard, an 802.11n standard, an 802.11ac standard, and an 802.11ad standard.

In Example 40, obtaining routing rules in Examples 35-39 can optionally include obtaining routing rules that indicate relative priority for access networks based on a cell type.

In Example 41, the rules that indicate relative priority for access networks based on a cell type of Example 40 can optionally indicate a priority for one or more of HSPA, HSPA+, HSPA+ Advanced, and UTRAN.

In Example 42, obtaining routing rules in Examples 35-41 can optionally include obtaining routing rules that include an ISRP.

Example 43 is a method for synchronizing an ANDSF MO. The method includes storing an ANDSF MO indicating network selection rules for a mobile wireless device. The method include establishing communication with the mobile wireless device. The method includes synchronizing at least a portion of the ANDSF MO with the mobile wireless device. The at least a portion of the ANDSF MO indicates a preference for access networks having a specific RAT.

In Example 44, the network selections rules of Example 43 can optionally include an ISMP.

In Example 45, the network selections rules of Examples 43-44 can optionally include an ISRP.

In Example 46, the ANDSF MO of Examples 43-45 is optionally OMA DM compliant.

In Example 47, the ANDSF MO of Examples 43-46 can optionally include an XML data scheme with leaves indicating the specific RAT.

In Example 48, the ANDSF MO of Examples 43-47 can optionally indicate a relative priority for the specific RAT comprising one or more of a 3GPP RAT and a WLAN RAT.

Example 49 is an apparatus that includes means to perform a method in any of Examples 25-48.

Example 50 is a machine readable storage including machine-readable instructions that, when executed, implement a method or realize an apparatus of any of Examples 25-49.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many Changes may be made to the details of the above-described embodiments without departing from the underlying principles of the invention. The scope of the present invention should, therefore, be determined only by the following claims.

The invention claimed is:

1. User equipment (UE) comprising:
a memory device to store an access network detection and selection function (ANDSF) management object (MO), wherein the ANDSF MO comprises network routing rules for routing IP traffic matching a specific IP flow, at least one network routing rule identifying 3rd Generation Partnership Project (3GPP) radio access technology (RAT) types and relative WLAN routing priorities for each of the 3GPP RAT types with respect to wireless local area network (WLAN) access for the IP traffic flows, the relative routing priorities of 3GPP RAT types with respect to WLAN access defined distinctly from 3GPP RAT mobility selection priorities, the 3GPP RAT types including global system for mobile communications (GSM) enhanced data rates for GSM evolution (EDGE) radio access network (GERAN), universal terrestrial radio access network (UTRAN) and evolved UTRAN (E-UTRAN), wherein the ANDSF MO comprises an XML data scheme with leaf nodes indicating a specific RAT type; and
a processor to:
select a 3GPP RAT comprising a 3GPP RAT type;
identify an available WLAN access;
simultaneously provide connections to the WLAN access and the 3GPP RAT;

compare, based on the at least one network routing rule, a relative routing priority of the 3GPP RAT type with respect to WLAN to form a comparison, without influencing the 3GPP RAT selection; and when the relative WLAN priority of the selected 3GPP RAT is less is greater than the selected 3GPP RAT, route traffic through the available WLAN access based on the comparison;

when the relative WLAN priority of the selected 3GPP RAT is greater than the WLAN, route traffic through the 3GPP RAT based on the-comparison.

2. The UE of claim 1, wherein the at least one network selection rule indicates that a first 3GPP access network with a first RAT type has a higher priority than the WLAN access, and that a second 3GPP access network with a second RAT type has a lower priority than the WLAN access.

3. The UE of claim 1, wherein the at least one network selection rule further comprises rules indicating a priority for a non-3GPP access network in addition to the WLAN access.

4. The UE of claim 1, further comprising a prioritization of a plurality of different 3GPP RAT types, wherein the prioritization comprises indicating a priority with respect to the WLAN access for one or more of a universal terrestrial radio access network (UTRAN), an evolved UTRAN (E-UTRAN), and a global system for mobile communications (GSM) enhanced data rates for GSM evolution (EDGE) radio access network (GERAN).

5. The UE of claim 1, wherein the at least one network selection rule comprises an inter-system mobility policy (ISMP).

6. The UE of claim 1, wherein the at least one network selection rule comprises a wireless local area network (WLAN) Selection Policy (WLANSP).

7. Processing circuitry for a wireless mobile device, comprising:
a connection component configured to establish a plurality of active access network connections based at least in part on 3GPP radio access technology (RAT) mobility selection priorities, wherein the active access network connections include a 3rd generation partnership project (3GPP)-compliant network using one or more 3GPP-compliant access technologies and a WLAN;
a rules component configured to obtain routing rules that specify how IP traffic flows are to be routed over the active access network connections based on a relative priority for a selected specific RAT type of the 3GPP-compliant network with respect to the WLAN, the relative routing priorities of 3GPP RAT types with respect to WLAN defined distinctly from 3GPP RAT mobility selection priorities, the 3GPP RAT types including global system for mobile communications (GSM) enhanced data rates for GSM evolution (EDGE) radio access network (GERAN), universal terrestrial radio access network (UTRAN) or evolved UTRAN (E-UTRAN); and
a traffic component configured to route the IP traffic flows over the active access network connections based on the routing rules,
wherein the routing rules comprise an XML data scheme with leaf nodes indicating a specific RAT type.

8. The processing circuitry of claim 7, wherein the IP traffic flows comprise a first traffic flow and a second traffic flow and the active access networks comprise a first active access network and a second access network, and wherein the traffic component is configured to route the first traffic flow over the first active access network and route the second traffic flow over the second active access network based on the routing rules.

9. The processing circuitry of claim 7, wherein the routing rules indicate relative priority for access networks based on a plurality of different 3GPP radio access technology (RAT) types as compared to a RAT type for the WLAN RAT.

10. The processing circuitry of claim 9, wherein the routing rules indicate relative priority for access networks based on a non-3GPP-compliant wireless local area network (WLAN) RAT with respect to a plurality of 3GPP RATs comprising a universal terrestrial radio access network (UTRAN), an evolved UTRAN (E-UTRAN), and a global system for mobile communications (GSM) enhanced data rates for GSM evolution (EDGE) radio access network (GERAN).

11. The processing circuitry of claim 10, wherein indicating a priority based on a non-3GPP-compliant WLAN RAT comprises indicating a priority for one or more of an 802.11a standard, an 802.11b standard, an 802.11g standard, an 802.11n standard, an 802.11ac standard, and an 802.11ad standard.

12. The processing circuitry of claim 7, wherein the routing rules comprise an inter-system routing policy (ISRP).

13. A computer program product comprising a non-transitory computer-readable storage medium storing program code for causing one or more processors to perform a method, the method comprising:
storing an access network detection and selection function (ANDSF) management object (MO) indicating routing selection rules for a mobile wireless device;
establishing communication with the mobile wireless device; and
synchronizing at least a portion of the ANDSF MO with the mobile wireless device, wherein the at least a portion of the ANDSF MO indicates a relative WLAN priority of 3rd Generation Partnership Project (3GPP) radio access technologies (RATs) relative to a wireless local area network (WLAN) RAT, the ANDSF MO indicating a comparison between a selected 3GPP RAT and the WLAN RAT having simultaneous connections with the mobile wireless device and without influencing the 3GPP RAT selection, the routing selection rules indicating relative WLAN routing priorities of 3GPP RAT types with respect to the WLAN RAT that are defined distinctly from 3GPP RAT mobility selection priorities,
wherein the ANDSF MO comprises an XML data scheme with leaf nodes indicating a specific RAT.

14. The computer program product of claim 13, wherein the ANDSF MO is open mobile alliance (OMA) device management (DM) compliant.

15. The computer program product of claim 13, wherein the network selections rules comprise an inter-system mobility policy (ISMP).

16. The computer program product of claim 13, wherein the network selections rules comprise an inter-system routing policy (ISRP).

17. The UE of claim 1, wherein the UE includes an antenna, a touch sensitive display screen, a speaker, a microphone, a graphics processor, an application processor, internal memory, a non-volatile memory port, or combinations thereof.

18. A server comprising:
a memory device to store an access network detection and selection function (ANDSF) management object (MO) indicating network routing rules for a mobile wireless device; and
one or more processors to:
 establish communication with the mobile wireless device; and
 synchronize at least a portion of the ANDSF MO with the mobile wireless device, wherein the at least a portion of the ANDSF MO indicates relative priority of one or more 3rd Generation Partnership Project (3GPP) radio access technologies (RATs) with respect to wireless local area network (WLAN) RAT for routing IP traffic matching a specific flow, the ANDSF MO indicating a comparison between a selected 3GPP RAT and the WLAN RAT without influencing the 3GPP RAT selection, the relative routing priorities of 3GPP RAT types with respect to the WLAN RAT and defined distinctly from 3GPP RAT mobility selection priorities, the relative priority of at least one of the one or more 3GPP RATs based at least in part on a 3GPP RAT type of global system for mobile communications (GSM) enhanced data rates for GSM evolution (EDGE) radio access network (GERAN), universal terrestrial radio access network (UTRAN) or evolved UTRAN (E-UTRAN), wherein the ANDSF MO comprises an XML data scheme with leaf nodes indicating a specific 3GPP RAT.

19. A computer program product comprising a non-transitory computer-readable storage medium storing program code for causing one or more processors to perform a method, the method comprising:
 storing an access network detection and selection function (ANDSF) management object (MO), wherein the ANDSF MO comprises network routing rules indicating relative priority for radio access technologies (RATs) of access networks, the rules defining a relative prioritization of a plurality of different 3rd Generation Partnership Project (3GPP) radio access technology (RAT) types with respect to wireless local area network (WLAN) access, the relative prioritization of 3GPP RAT types with respect to WLAN access defined distinctly from 3GPP RAT mobility selection priorities, wherein the ANDSF MO comprises an XML data scheme with leaf nodes indicating a specific 3GPP RAT type;
 select a 3GPP access network having a 3GPP RAT type;
 identifying an available WLAN access and one or more available RAT types of 3GPP access networks, the one or more available RAT types including global system for mobile communications (GSM) enhanced data rates for GSM evolution (EDGE) radio access network (GERAN), universal terrestrial radio access network (UTRAN) or evolved UTRAN (E-UTRAN); and
 routing traffic through either the available WLAN access or selected 3GPP access networks based on the network routing rules comparing a first relative priority of the 3GPP RAT type of the selected 3GPP access network with respect to the WLAN access.

20. The computer program product of claim 19, wherein the network selection rules indicate that a first 3GPP access network with a first RAT type has a higher priority than the WLAN access, and that a second 3GPP access network with a second RAT type has a lower priority than the WLAN access.

21. The computer program product of claim 19, wherein the prioritization of the plurality of different 3GPP RAT types comprises indicating a priority with respect to the WLAN access for one or more of a universal terrestrial radio access network (UTRAN), an evolved UTRAN (E-UTRAN), and a global system for mobile communications (GSM) enhanced data rates for GSM evolution (EDGE) radio access network (GERAN).

22. The computer program product of claim 19, wherein the network selection rules indicating relative priority for access networks further comprise rules indicating a priority for a non-3GPP access network in addition to the WLAN access.

23. The computer program product of claim 19, wherein the method further comprises dynamically synchronizing the AND SF MO with an ANDSF server.

* * * * *